United States Patent Office 3,475,389
Patented Oct. 28, 1969

3,475,389
CROSSLINKABLE POLYSULFIDE POLYMERS
Faber B. Jones, Bartlesville, Okla., assignor to Phillips Petroleum Company, a corporation of Delaware
No Drawing. Filed Oct. 31, 1966, Ser. No. 590,478
Int. Cl. C08g 23/00
U.S. Cl. 260—79
16 Claims

ABSTRACT OF THE DISCLOSURE

Polysulfide polymers are prepared by contacting elemental sulfur, a hydrocarbon polythiol represented by the formula $R''(SH)_n$ wherein $R''$ is a hydrocarbon radical selected from the group consisting of saturated aliphatic, saturated cycloaliphatic, and aromatic radicals, and combinations thereof, said hydrocarbon radical having from 3 to about 20 carbon atoms and having a valence equal to $n$, and $n$ is an integer of at least 3 to provide crosslinkage sites and a dithiol of the formula

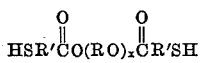

wherein R is an alkylene radical, R' is a divalent hydrocarbon radical and $x$ is equal to a value of at least one. The cured polymers produced by the above method have utility as adhesives.

---

This invention relates to polysulfide polymers. In one aspect it relates to crosslinkable polysulfide polymers. In another aspect polysulfide polymers are produced by reacting sulfur, a polythiol containing at least three mercapto groups, and a dithiol. In another aspect sulfur, a polythiol having at least three mercapto groups and a dithiol of the general formula

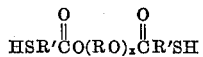

where R is an alkylene radical and each R' is a divalent hydrocarbon radical are reacted to produce crosslinkable polysulfide polymers. In another aspect polysulfide polymers prepared by reacting sulfur, a polythiol having at least three mercapto groups and a dithiol are crosslinked to produce higher molecular weight derivatives thereof. In yet another aspect of this invention, dithiols having the formula

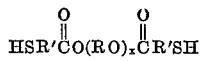

are prepared by the esterification of a mercapto acid with a diol and are reacted with sulfur and a polythiol containing at least three mercapto groups to produce crosslinkable polysulfide polymers. The presence of functional end groups in the polymeric materials provides a means for the formulation of sealants, adhesives and other similar materials which may be reacted further chemically or by heat treatment. It is especially desirable in certain applications to provide such polymeric materials with pendant thiol groups which can be readily oxidized to sulfides by conventional curing agents to produce a crosslinked material having sufficient strength for application as desired.

It is therefore one object of this invention to provide an improved polymeric material. It is another object of this invention to provide a method for producing improved polymeric materials. It is yet another object of this invention to provide a method for producing polysulfide polymers. It is a further object of this invention to provide a method for producing crosslinkable polysulfide polymers of superior quality. It is yet another object of this invention to provide curable liquid polysulfide polymers which can be crosslinked to form solid compositions.

Other objects, aspects and the several advantages of this invention will be apparent from the following disclosure and the appended claims.

In accordance with one embodiment of this invention crosslinkable polysulfide polymers having residual thiol groups therein are prepared by reacting sulfur, a polythiol having at least three mercapto groups and the dithiol condensation product of a mercapto acid and a diol.

The crosslinkable polysulfide polymer is prepared by reacting sulfur, a polythiol containing at least three mercapto groups, and a dithiol having the formula

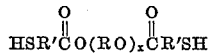

where R is an alkylene radical having 2 to 4 carbon atoms; R' is a divalent hydrocarbon radical having 1 to about 20 carbon atoms and selected from the group consisting of alkylene, cycloalkylene, and arylene, and combinations thereof such as aralkylene, alkarylene, and the like; and $x$ is an integer of 1–100.

The preferred polymers of this invention are relatively low molecular weight materials which are liquid at ambient conditions and can be cured to solid compositions possessing greater tensile strength and elongation than the cured polymers obtained from existing commercially available liquid polysulfides, thus making them particularly valuable in sealant and adhesive applications.

Said polythiol which can be used in the process of this invention can be represented by the formula $$R''(SH)_n$$

where $R''$ is a hydrocarbon radical selected from the group consisting of saturated aliphatic, saturated cycloaliphatic, and aromatic radicals, and combinations thereof such as aryl-substituted aliphatic radicals, alkyl-substituted aromatic radicals, and the like, said hydrocarbon radical having from 3 to about 20 carbon atoms and having a valence equal to $n$, and $n$ is an integer of at least 3 to provide crosslinkage sites. Although $n$ will generally be within the range of 3 to 6, it is presently preferred that $n$ be 3 or 4 because of the greater availability of the compounds.

Examples of polythiols suitable for use in accordance with the invention include 1,2,3-propanetrithiol, 1,2,4-butanetrithiol, 1,2,3,4-butanetetrathiol, 1,2,3-pentanetrithiol, 3-methyl-1,2,3-heptanetrithiol, 1,2,10-decanetrithiol, 1,2,3,5,6-dodecanepentathiol, 1,2,4,5,7,8-hexadecanehexathiol, 2,3,5,8-eicosanetetrathiol, 1,2,3-cyclopentanetrithiol, 1,2,3,4-cyclohexanetetrathiol, 2-ethyl-1,2,3,4-cyclooctanetetrathiol, 2-(mercaptomethyl)-1,3 - cyclopentanedithiol, 2-cyclohexyl-1,3,4-butanetrithiol, 1,2,3-benzenetrithiol, 1, 2,4,5-benzenetetrathiol, toluene - 2,3,4 - trithiol, toluene-alpha, 2,3,4-tetrathiol, and 2-phenyl-1,3,6-hexanetrithiol, and mixtures thereof.

The dithiol utilized in the process of this invention is readily prepared by esterification of a mercapto acid having the formula

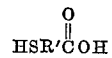

with a diol having the formula $$HO(RO)_xH$$

where R, R', and $x$ are as defined above. Conventional esterification techniques can be employed. Although larger or smaller ratios can be used, the mole ratio of mercapto acid to diol is preferably approximately 2:1. Preferably, an acid such as benzenesulfonic acid or p-toluenesulfonic acid is used to catalyze the esterification. If desired, a solvent, e.g., an aromatic hydrocarbon such as benezene, toluene, or xylene, or a saturated aliphatic or cycloaliphatic hydrocarbon such as hexane, octane, decane, cyclohexane, or methylcyclopentane, can be employed, in which instance water produced in the course of the reaction can be removed conveniently by azeotropic distillation.

The esterification can be carried out in an inert atmosphere, e.g., nitrogen, to inhibit by-product formation. Although other conditions of reaction temperature and time can be employed, the esterification is generally most advantageously carried out at temperatures of about 80° C. to about 200° C. for a period of time within the range of about 30 minutes to about 24 hours.

Examples of some mercapto acids which can be used in the esterification process include mercaptoacetic acid, 2-mercaptopropionic acid, 3-mercaptopropionic acid, 4-mercaptobutyric acid, 6-mercaptohexanoic acid, 2-mercapto-4-ethyloctanoic acid, 3-mercaptohexadecanoic acid, 2-mercaptoheneicosanoic acid, 4-mercaptocyclohexanecarboxylic acid, 2 - methyl-3-mercaptocyclopentanecarboxylic acid, 2-mercapto-3-cyclohexylpropionic acid, 3-mercaptobenzoic acid, 4-mercapto-o-toluic acid, mercaptophenylacetic acid, and mixtures thereof.

Examples of some diols which can be used in the esterification process include ethylene glycol, diethylene glycol, triethylene glycol, tetraethylene glycol, pentaethylene glycol, octaethylene glycol, eicosaethylene glycol, pentacontaethylene glycol, hectaethylene glycol, propylene glycol, dipropylene glycol, tripropylene glycol, tetrapropylene glycol, octapropylene glycol, triacontapropylene glycol, hectapropylene glycol, butylene glycol, dibutylene glycol, tributylene glycol, tetrabutylene glycol, decabutylene glycol, tetracontabutylene glycol, hectabutylene glycol, trimethylene glycol, ditrimethylene glycol, tritrimethylene glycol, tetratrimethylene glycol, dodecatrimethylene glycol, hexacontatrimethylene glycol, hectatrimethylene glycol, tetramethylene glycol, ditetramethylene glycol, tritetramethylene glycol, octatetramethylene glycol eicosatetramethylene glycol, hectatetramethylene glycol, and mixtures thereof. It is to be understood, of course, that polyalkylene glycols containing two or more different alkylene radicals, e.g., an ethylene radical and a trimethylene radical, can be employed.

The mole ratio of polythiol containing at least three mercapto groups to dithiol can vary over a broad range, depending in part on the particular polythiol employed, but will generally be in the range of about 0.001:1 to about 0.2:1, preferably being in the range of about 0.005:1 to about 0.1:1. The ratio of dithiol to sulfur will generally be in the range of about 0.5 to about 4 moles of dithiol per gram-atom of sulfur, preferably being in the range of about 0.8 to about 2 moles of dithiol per gram-atom of sulfur.

The polythiol, dithiol, and sulfur can be reacted either alone or with catalyst and/or solvent. When desired, a basic catalyst can be utilized to accelerate the reaction of the sulfur with the thiols. The presently preferred catalysts are amines, ammonia, and the oxides, hydroxides, and carbonates of lithium, sodium, potassium, rubidium, cesium, magnesium, calcium, strontium, and barium. Although the amine catalysts can be primary, secondary, or tertiary amines, the preferred amines are tertiary aliphatic, cycloaliphatic, aromatic, or heterocyclic amines having 3 to about 24 carbon atoms, e.g., trimethylamine, triethylamine, tributylamine, trioctylamine, tricyclohexylamine, N,N-dimethylaniline, pyridine, and the like.

When desired, a solvent such as chloroform, carbon tetrachloride, benzene, toluene, xylene, or the like can be employed. Although the order of addition of the sulfur, polythiol, and dithiol can be varied, it is presently preferred to premix the polythiol and dithiol to provide a more uniform polymer. All of the sulfur can be introduced at once, or it can be added incrementally.

Although the reaction temperature can vary within a considerable range, it will generally be in the range of about —20° C. to about 250° C., usually being in the range of about 20° C. to about 200° C. The reaction time also can vary considerably, depending in part on the temperature and the presence or absence of a catalyst, but will generally be in the range of about 1 minute to about 2 days, usually being in the range of about 5 minutes to about 12 hours. The pressure need be only sufficient to prevent substantial volatilization of the substances used in carrying out the reaction.

The liquid polymers can be cured to solid materials by utilizing any of the curing agents conventionally employed for existing polysulfide polymers; free oxygen-containing fluid, such as for example, air; organic peroxides and hydroperoxides such as for example, di-tert-butyl peroxide and cumene hydroperoxide; metal oxides such as for example, the oxides of lead, dinc, maganese, calcium, barium, copper, mercury, tin and iron; metal salts of carboxylic acids, such as for example, lead stearate, zinc laurate, zinc acetate; ammonium persulfate, and the like. The curing time will vary with the polymer, the curing agent, and the temperature.

Fillers such as carbon black, zinc sulfide, titanium dioxide, calcium carbonate, aluminum oxide, and aluminum silicate can be incorporated into the polymer to strengthen the cured polymer and/or to reduce the cost.

Other reinforcing or extending fillers, pigments, resins, and/or plasticizers can be incorporated into the polymer as desired.

The polymers containing the pendant mercapto groups are reactive in the presence of air, crosslinking readily at ambient temperatures if exposed to air. The crosslinked polymers so formed are all infusible and insoluble to some degree, the degree of infusibility and insolubility depending on the number of pendant mercapto groups per molecule. In those cases in which the polyer containing pendant mercapto groups is to be reacted with another reactant, it is preferable that air be excluded. The reaction should be carried out under anaerobic conditions by flushing the reaction mixture with nitrogen or by removing all air from the reaction mixture by evacuation. If the polymer containing pendant mercapto groups is to be stored after preparation, it is preferably stored in vacuo or under an atmosphere of nitrogen.

The polymer can be purified after the reaction is complete by removal of the excess mercapto acid by such techniques as freeze-drying, heating in vacuo, azeotropic distillation, or by precipitation of the polymer by a non-solvent for it, which non-solvent is a solvent for the mercapto acid. Preferably, the polymer is purified by washing with water and/or aqueous base.

Solutions of the polymers containing pendant mercapto groups are useful as coatings which become insoluble and infusible by exposure to air. Thus, exposure to air at ambient temperature, i.e., without the necessity of a baking or elevated temperature curing operation, produces films which are insoluble in common solvents and resistant to flow and sagging at elevated temperatures.

EXAMPLE

Into a 2-liter 3-necked flask equipped with stirrer, condenser, and Dean-Stark tube were placed 1.5 moles (225 g.) of triethylene glycol, 350 g. (3.3 moles) of 3-mercaptopropionic acid, 900 ml. of toluene, and 5.7 g. (0.03 mole) of p-toluenesulfonic acid monohydrate. The mixture was refluxed under a nitrogen atmosphere for 6¾ hours, during which time 51 ml. of water was collected in the Dean-Stark tube. The reaction mixture was allowed to cool to room temperature, after which it was washed with five 300-ml. portions of 10 percent sodium bicarbonate and five 300-ml. portions of water. The toluene layer was dried over magnesium sulfate, and the toluene was removed under reduced pressure to give as a residue 472 g. of the bis(3-mercaptopropionate) of triethylene glycol (HSCH$_2$CH$_2$CO$_2$CH$_2$CH$_2$OCH$_2$
CH$_2$OCH$_2$CH$_2$O$_2$CCH$_2$CH$_2$SH)

*Analysis.*—Calcuated for C$_{12}$H$_{22}$O$_6$S$_2$: C, 44.2; H, 6.7; O, 29.4; S, 19.6. Found: C, 44.1; H,6.7; O, 29.4; S, 19.4.

To a mixture of 100 g. (0.305 mole) of the above bis (3-mercaptopropionate) of triethylene glycol, 1.51 g. (0.0107 mole) of 1,2,3-propanetrithiol, and 0.05 g. of tributylamine was added slowly at 24–32° C., over a perod of 1½ hours, 9.16 g. (0.286 g.-atom) of sulfur. The mixture was then maintained at 32–35° C. for 20 minutes, after which the temperature was raised to about 135° C. over a period of 15 minutes. The temperature was then maintained at about 130–150° C. for 1 hour and 35 minutes. During the last 50 minutes of this period the mixture was maintained under reduced pressure to aid in the removal of hydrogen sulfide produced in the process. The resulting viscous liquid polymer weighed 100 g. and had a molecular weight of about 4000. In addition to having a plurality of either, ester, and polysulfide linkages, the polymer contained within the molecule a plurality of mercapto groups, these mercapto groups serving as crosslinking sites in the subsequent oxidative coupling, or curing, of the polymer.

To 33.4 g. of the above polymer was added 3.6 g. of a lead dioxide paste containing 67 weight percent lead dioxide and 33 weight percent dibutyl phthalate. The lead dioxide was used in an amount calculated to be 10 percent in excess of that required to react with the available thiol functionality. Good curing of the polymer was achieved at about 25° C. within 2 hours. After the cured polymer had stood at about 25° C. for 6 days, its physical properties were compared with those of similarly cured Thiokol LP-2, a polysulfide polymer derived from bis(2-chloroethyl) formal.

|  | Cured Novel Polymer | Cured Thiokol LP-2 |
| --- | --- | --- |
| Tensile strength, p.s.i.[1] | 171 | 91 |
| Elongation at break, percent [1] | 143 | 103 |
| Shore A hardness [2] | 50 | 35 |

[1] ASTM D412–62T.
[2] ASTM D676–59T, Shore Durometer, Type A.

Thus, the cured novel polymer of this invention possessed physical properties superior to those of similarly cured Thiokol LP-2.

Numerous variatons and modifications of the concept of this invention will be apparent to one skilled in the art in view of the foregoing disclosure and the appended claims to this invention, the essence of which is that crosslinkable polysulfide polymers are prepared by reacting sulfur, a polythiol containing at least three mercapto groups, and the dithiol condensation product of a mercapto acid and a diol.

I claim:
1. A method of producing polysulfide polymers which comprises contacting elemental sulfur, a hydrocarbon polythiol having at least three thiol groups per molecule, the hydrocarbon radical of said polythiol having from about 3 to about 20 carbon atoms per molecule and being selected from the group consisting of saturated aliphatic, saturated cycloaliphatic, and aromatic radicals and combinations thereof, and a dithiol of the formula

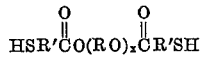

wherein R is an alkylene radical, R' is a divalent hydrocarbon radical and $x$ is equal to a value of at least one.

2. The method of claim 1 wherein said polythiol has from about 3 to about 6 thiol groups per molecule.

3. The method of claim 1 wherein R is an alkylene radical having from about 2 to about 4 carbon atoms, each R' is selected from the group consisting of alkylene, cycloalkylene, arylene and combinations thereof.

4. The method of claim 3 wherein said R' has from 1 to about 20 carbon atoms and $x$ is an integer of from 1 to about 100.

5. The method of claim 1 wherein said contacting is effected in the presence of a catalyst selected from the group consisting of amines, ammonia, and the oxides, hydroxides and carbonates of lithium, sodium, potassium, rubidium, cesium, magnesium, calcium, strontium, and barium.

6. The method of claim 1 wherein said contacting is effected in the presence of a solvent selected from the group consisting of chloroform, carbon tetrachloride, benzene, toluene, and xylene.

7. The method of claim 1 wherein said polythiol and said dithiol are blended prior to contacting with said sulfur.

8. The method of claim 1 wherein said contacting is effected at a temperature within the range of from about −20° C. to about 250° C.

9. The method of claim 1 wherein said polysulfide polymer thus formed is cured to crosslink said polymer in the presence of a curing agent selected from the group consisting of free oxygen-containing fluids, organic peroxides and hydroperoxides, metallic oxides, metal salts of carboxylic acids, and ammonium persulfate.

10. The method of claim 1 wherein said dithiol is the bis(3-mercaptopropionate) of triethylene glycol, said polythiol is 1,2,3-propanetrithiol, and said contacting is effected in the presence of tributylamine.

11. The polysulfide polymer produced in accordance with the method of claim 1.

12. The crosslinked polysulfide polymer produced in accordance with the method of claim 9.

13. The polysulfide polymer produced in accordance with the process of claim 10.

14. A method of curing the polysulfide polymer produced in accordance with the method of claim 10 which comprises contacting said polymer with a crosslinking agent selected from the group consisting of free oxygen-containing fluids, organic peroxides and hydroperoxides, metallic oxides, metal salts of carboxylic acids, and ammonium persulfate.

15. The method of claim 1 wherein the mole ratio of said polythiol to said dithiol is within the range of from about 0.001:1 to about 0.2:1, and the ratio of the gram mols of said dithiol to gram-atoms of said sulfur is within the range of from about 0.5:1 to about 4:1.

16. The method of claim 1 wherein the mole ratio of said polythiol to said dithiol is within the range of from about 0.005:1 to about 0.1:1, and the ratio of the gram mols of said dithiol to gram-atoms of said sulfur is within the range of from about 0.8:1 to about 2:1.

References Cited
UNITED STATES PATENTS 3,278,496 10/1966 Le Fave et al. _____ 260—79
3,389,106 6/1968 Simpson _____ 260—24

DONALD E. CZAJA, Primary Examiner

M. I. MARQUIS, Assistant Examiner

U.S. Cl. X.R.
260—18, 37, 608